3,313,705
PANCREAS-BASED MEDICAMENT
Michel Constant Gaston Abel Henry, Neuilly-sur-Seine, France, assignor to EURORGA, Villeras-par-Saclay, Seine-et-Oise, France, a company of France
No Drawing. Filed Apr. 20, 1964, Ser. No. 361,257
Claims priority, application France, Apr. 25, 1963, 932,693
5 Claims. (Cl. 167—75)

This invention relates to a process for the preparation of a pancreas-based medicament and to the medicament obtained thereby.

Many pharmaceutical products are produced from pancreas. Some are based upon dried and delipidated pancreas, such as the enzymatic preparations based upon "pancreatins," while others are based upon purified enzymes, notably enzymes extracted from the pancreas and comprising pancreatic "lipase."

In the Pharmacopoea Gallica (Codex, 1937 and 1949), pancreatin is defined as the product obtained by low-temperature drying of pulp formed from pig's pancreas, freeing the dried pulp from its lipids by treatment with ether and then pulverising it. Similarly, "Dispensatory of the U.S.A." (based on the 12th revision of the U.S. Pharmacopoea, the National Formulary 7th edition, and the British Pharmacopoea 1932 and addenda) indicate that, according to the British Pharmacopoea, pancreatin can be obtained from fresh pancreas of certain animals commonly employed for food, by extraction of one part of pancreas by means of four parts of 25% alcohol.

Clinical experiments have now shown that the whole, fresh pancreas is effective against severe chronic pancreatitis, while pancreatins are not. It may reasonably be assumed that some useful parts of the whole fresh pancreas are destroyed, rendered inactive or eliminated by the operations to which the fresh pancreas is subjected for the preparation of pancreatins.

Moreover, it has been established that the pancreas does not merely contain a single lipase, but contains many kinds of esterases, specific and non-specific, true lipases, water-soluble or fat-soluble, and lipoprotein-lipases, which are associations of true lipases and proteases, notably collagenases, and in particular pancreatic elastase.

It may be, therefore, that the absence of one or more of these substances in the known medicaments explains the inability of the latter to act effectively against severe chronic pancreatitis. This is borne out by the fact that the ingestion of crude pancreas corrects the effects of total pancreatectomy in animals and reduces or eliminates those of chronic pancreatitis (faecal excretion of fats and proteins). It is, however, difficult for patients to obtain the necessary daily ration of crude pig's pancreas (one 60 to 80 g. pancreas). Indeed, because of its repulsive appearance, its unpleasant taste, which is very difficult to conceal, and its essentially perishable character, patients are treated with crude pig's pancreas only when it is absolutely necessary.

It will be seen that, using the present invention, a pancreas-based medicinal preparation can be obtained in the form of a powder which can be ingested as such, i.e. more particularly without enteric coating, and which, for reasons still unknown, possesses an unexpected curative effect.

According to the present invention, a process for the production of a medicament especially suitable for the treatment of chronic pancreatitis, comprising subjecting fresh, whole, pig's pancreas to low-temperature drying conditions and converting the product, without removing any of its components and in particular the lipids, into a form suitable for administration as a medicament.

By "a whole pancreas" is meant the whole gland, which has only been freed from fats and tissues adhering externally thereto which do not form an integral part of the gland. The use of the adjective "fresh" indicates that the gland must be subjected to the low temperature drying conditions as soon as possible after its extraction from the carcass of a pig which has just been slaughtered. In practice, a pancreas is regarded as fresh if it is separated from the carcass not more than a quarter of an hour after slaughtering, is then stabilised by cooling to a tempertaure not exceeding 8° C. and is subjected to low temperature, drying conditions not more than two hours after slaughtering.

Preferably, the process is subjected to lyophilisation conditions, i.e. freezing to a temperature of −40° C. or lower and applying a vacuum so that the water contained therein, which has been converted into ice, is removed by sublimation. However, an alternative is to dry the pancreas in vacuo at a temperature not exceeding +3° C., if required in the presence of a moisture-absorbing substance.

Lyophilisation (also called "freeze-drying") is, as already stated, preferred and the following procedure is particularly suitable for preparing the medicinal preparation:

Fresh pig's pancreas, extracted immediately after slaughtering, are freed from adherent fats and tissues. Without an intermediate freezing step, but after cooling to a temperature not exceeding +8° C., the pancreas are then passed through a grinding mill under conditions such that they are not heated above +15° C. Iced water, which may be flavoured if desired, is then added to the ground product in an amount corresponding to about 30–100% of its weight, preferably about 50%. It is desirable to add also about 1–10% of its weight of lactose; this facilitates the sublimation during the lyophilisation, and also facilitates the final chopping. However, the presence of lactose in the final product is in no way necessary for its effectiveness.

The mixture is thereafter passed into a finer grinding mill so as to provide an extremely fine and smooth liquid paste. This paste immediately frozen, e.g. at a temperature of about −40° C. into the form of plates, and sublimation of the ice is carried out in vacuo until the product is substantially completely deyhdrated.

The cakes of lyophilised pancreas are ground (without removal of fat). The powder obtained may be screened and distributed in bottles sealed in vacuo or under an inert gas and provided with dehydrating stoppers.

The following example illustrates the invention.

*Example*

Fresh pancreas aseptically extracted and cooled are first ground on a plate having 2 mm. perforations by means of a turbo-mill KS of Karl Schnell (Maschinenfabrik Winterrach, Germany). Owing to its very rapid passage through the plate, the temperature at which the ground product is delivered is only slightly above that at which it is admitted (for example 14° C. instead of 8° C.).

25% of its weight of water (of which 10% is in the form of ice), 2.5% of lactose and 0.1% of ascorbic acid are then added to the ground product. In order to aromatise the preparation, there is also added at this stage 30% by weight of fresh-pressed orange juice.

The suspension thus obtained is again passed through the turbo-mill KS, which in this case has been equipped with a plate having apertures of 0.8 mm., whereby the cutting-away of the fibres is completed and the whole mass is intimately emulsified (the presence of the ice prevents deleterious rise in temperature at this stage).

The suspension is then brought into the form of plates and frozen at −40° C. by keeping it in a freezing tank (for example Usifroid) maintained at −60° C. for 2 hours.

The plates are placed in sublimation apparatus (for example Usifroid) under the following conditions:
(1) Partial pressure of the order of 0.2 mm. Hg.
(2) Temperature of the product adjusted to −30° C.

The sublimation vapours are condensed on a coil at −60° C. Electrical heating compensates for the losses of heat due to the sublimation. Equilibrium is established and enables a constant temperature to be maintained. When the sublimation proper is complete (about 20 hours), the residual humidity is still 4–5%.

The pancreas material is then heated at +35° C. and the partial pressure lowered to a maximum of 0.01 mm. Hg. At the end of 4 hours, the residual humidity has fallen to about 0.5%.

The plates of pancreas are then cut into strips and introduced into a Forplex turbine grinding mill. The central turbine throws the pancreas against a grid having oval holes measuring 0.2 mm. x 0.5 mm. and chops it. A fine powder is produced by a second pass.

Bottles are then filled with the powder using a 10-gramme powder dosaging device and placed in the tank of the sublimation apparatus. A high vacuum (below 0.01 mm. Hg) is produced and heating is carried out at 35° C. for 4 hours.

When the vacuum is broken, dry argon is introduced into the tank. This not only prevents any return of moisture (due to the hygrometry of the air), but also facilitates the desorption.

The bottles are withdrawn and immediately closed using a polyethylene plug provided with a dehydrating pellet. Aluminum caps are then crimped onto each of the bottles.

The product obtained is in the form of a powder, of which about 14 g. are obtained by treating a pancreas weighing from 60 to 80 g. The ratio between the amino nitrogen and the total nitrogen shows that the proteins have not undergone any autolysis. Generally speaking, the total nitrogen content is 8.6±0.8% and the lipid content is 30.5±3%. In addition, the histamine content of six preparations was found to be 3, 5, 5, 3, 7, 3 and 4γ per g. of lyophilised product respectively which are much lower than the values found in commercial pancreatins.

The medicament of this invention finds its major use in combatting chronic pancreatitis which is amenable to substitutive opotherapy, because:

It can aid even a most seriously diseased gland and can transform the life of the most handicapped patients;

It is effective in cases where commercial pancreatins prove insufficient;

Its effectiveness is identical to that of fresh pancreas, for which it acts as an advantageous substitute by reason of the aforesaid properties (ready absorption, good keeping properties and precise posology).

In addition, it has an interesting applicability in the treatment of pancreatic fistulas, because it is capable of setting the gland at rest, which permits rapid closing of the fistula, and on the other hand, it temporarily takes on the function of the gland, thus improving the protein-lipid digestion.

Finally, the lyophilised powder of total pancreas may find use:

After wide pancreatic exereses, by reducing the exocrine insufficiency which may arise in the period immediately following such interventions;

In the treatment of aerophagia and the substitutive therapy of the senile pancreas, and in the course of considerable denutrition with external functional pancreatic insufficiency, which it sometimes found impossible to correct by dietetic treatment alone.

In order to maintain the full activity of the powder obtained as described above, it is preferred that it should be ingested as such orally, although it may also be taken in the form of granules, tablets or pills without enteric coating.

On average, the dosage is of the order of 10 g. per day for total substitutive therapy and of the order of 0.5 to 1 g. per day for minor disorders of the digestive system.

A large number of unexpected results have already been recorded:

Patients affected by chronic severe pancreatitis and in whom the pancreas was no longer performing any useful function, had to be given an insulin injection daily and had to absorb each day one fresh crude pig's pancreas (60 to 80 g.). The latter was replaced by the lyophilised product of the example in a dosage of 10 to 14 g. of powder per day. The powder did not produce any feeling of repugnance in the patients as did the crude pancreas. They appeared to eat with a better appetite and their general condition distinctly improved after treatment for one month.

Several of these patients lent themselves to an experiment which consisted in substituting for the powder of Example 1, the same powder delipidated with petroleum ether. Patches of undigested fats were found two days later in the stools. When the patients were again treated with the non-delipidated powder, their stools returned to normal (consistency, odour, absence of undigested fats).

Treatment with the whole pancreas powder also led to spectacular results in one case of very serious chronic calcifying pancreatitis of alcoholic origin, in which commercial pancreatic extracts (pancreatins) had proved ineffective.

Remarkable results were also obtained in the treatment of flatulent dyspepsia, aerocolia, aerogastry and colopathy with fermentations, the powder having been absorbed as such in a dosage of 3 to 5 g. Thus, even without enteric coating, the enzymes contained in the powder were protected against destruction by the digestive juices.

I claim:
1. Process for the production of a medicament especially suitable for the treatment of chronic pancreatitis, which comprises separating the pancreas from a pig's carcass at the latest a quarter of an hour after slaughtering, stabilising the pancreas by cooling to a temperature of at most 8° C., grinding the stabilised product, adding to the ground product about 30–100% of its weight of iced water, again grinding the product, and subjecting it to lyophilisation conditions to remove water by sublimation.

2. Process according to claim 1, wherein, between the first and second grinding operations, there are also added to the pancreas material lactose in an amount of about 1–10% and ascorbic acid in an amount of about 0.1%, calculated on the weight of the pancreas before the first grinding.

3. A method of treating patients suffering from chronic pancreatitis, which comprises administering orally to such a patient from 0.5 to 14 g. per day of the entire product obtained by a process comprising separating the pancreas from a pig's carcass at the latest a quarter of an hour after slaughtering, stabilising the pancreas by cooling to a temperature of at most 8° C., grinding the stabilised product, adding to the ground product about 30–100% of its weight of iced water, again grinding the product, and subjecting it to freeze drying to remove the water content of the product by sublimation.

4. A method of treating patients suffering from chronic pancreatitis, which comprises administering orally to such a patient from 0.5 to 14 g. per day of the entire product obtained by a process comprising separating the pancreas from a pig's carcass at the latest a quarter of an hour after slaughtering, stabilising the pancreas by cooling to a temperature of at most 8° C., grinding the stabilised product, adding to the ground product about 30–100% of its weight of iced water, adding about 1–10% lactose, based on the weight of the ground stabilised product, again grinding the product, and drying it in vacuo at a temperature of at most 3° C.

5. A composition suitable for the treatment of chronic pancreatitis, which comprises the product produced according to the process of claim 1.

References Cited by the Examiner
UNITED STATES PATENTS 3,127,317  3/1964  Kern _____ 167—75

ALBERT T. MEYERS, *Primary Examiner.*

LEROY B. RANDALL, *Assistant Examiner.*